(12) United States Patent
Ayadurai et al.

(10) Patent No.: US 10,687,244 B2
(45) Date of Patent: Jun. 16, 2020

(54) METHODS, FIRST TRANSMIT DEVICE AND RELAY DEVICE FOR SUPPORTING WIRELESS COMMUNICATION

(71) Applicant: Telefonaktiebolaget LM Ericsson (publ), Stockholm (SE)

(72) Inventors: Vicknesan Ayadurai, Sollentuna (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/333,487

(22) PCT Filed: Sep. 15, 2016

(86) PCT No.: PCT/SE2016/050861
§ 371 (c)(1),
(2) Date: Mar. 14, 2019

(87) PCT Pub. No.: WO2018/052348
PCT Pub. Date: Mar. 22, 2018

(65) Prior Publication Data
US 2019/0239111 A1    Aug. 1, 2019

(51) Int. Cl.
*H04W 28/02* (2009.01)
*H04W 40/24* (2009.01)
(Continued)

(52) U.S. Cl.
CPC ....... *H04W 28/0252* (2013.01); *H04W 16/26* (2013.01); *H04W 24/10* (2013.01);
(Continued)

(58) Field of Classification Search
CPC ..... H04W 84/18; H04W 88/02; H04W 88/04; H04W 40/24; H04W 8/005; H04W 24/10; H04W 16/26
See application file for complete search history.

(56) References Cited

U.S. PATENT DOCUMENTS

| | | | |
|---|---|---|---|
| 6,842,460 B1 | 1/2005 | Olkkonen et al. | |
| 7,184,703 B1 | 2/2007 | Naden et al. | |

(Continued)

FOREIGN PATENT DOCUMENTS

| | | |
|---|---|---|
| EP | 1679838 A1 | 7/2006 |
| EP | 1808981 A1 | 7/2007 |
| EP | 2846585 A1 | 3/2015 |

*Primary Examiner* — Keith Ferguson
(74) *Attorney, Agent, or Firm* — Sage Patent Group (57) ABSTRACT

A first transmit device (200), a relay device (202) and methods therein, for supporting wireless communication between transmit devices over a shared radio resource in a wireless network. The first transmit device (200) records (2:1B) source identities and destination identities of detected transmissions of data made by other transmit devices (204). When an own transmission of data is performed, the first transmit device (200) appends (2:2A) a report indicating the source identity and the destination identity of each detected transmission of data. By receiving (2:2B) transmissions of data with such appended reports from various transmit devices (200, 204), the relay device (202) is able to identify (2:3) two transmit devices (204A, 204B) that are not able to communicate directly with each other, and to forward (2:5) any transmission(s) (2:4) of data between the two identified transmit devices.

14 Claims, 5 Drawing Sheets

(51) Int. Cl.
*H04W 16/26* (2009.01)
*H04W 24/10* (2009.01)
H04W 84/18 (2009.01)
H04W 88/04 (2009.01)

(52) U.S. Cl.
CPC ............ H04W 40/24 (2013.01); *H04W 84/18* (2013.01); *H04W 88/04* (2013.01)

(56) References Cited

U.S. PATENT DOCUMENTS

| | | |
|---|---|---|
| 7,852,764 B2 | 12/2010 | Yamaguchi et al. |
| 8,180,385 B2 | 5/2012 | Aaron et al. |
| 2007/0237081 A1* | 10/2007 | Kodialam ............ H04L 43/0882 370/235 |
| 2010/0302947 A1 | 12/2010 | Leppanen et al. |
| 2014/0022908 A1* | 1/2014 | Ibuki .................... H04L 1/1825 370/236 |
| 2017/0093687 A1* | 3/2017 | Wu ....................... H04L 45/122 |

* cited by examiner

METHODS, FIRST TRANSMIT DEVICE AND RELAY DEVICE FOR SUPPORTING WIRELESS COMMUNICATION

TECHNICAL FIELD

The present disclosure relates generally to a first transmit device, a relay device and methods therein, for supporting wireless communication in a wireless network.

BACKGROUND

Wireless networks may be comprised of a large number of wireless devices ranging from complex and powerful computers to simple and inexpensive wireless communication entities such as wireless sensors and actuators. The wireless connectivity may also be different in different networks and multiple radio-access technologies, RATs, may also be used. The topology of the wireless networks may further range from traditional cellular networks where base stations and strong network control is employed, to so-called "ad-hoc" networks comprised of devices and nodes which communicate directly with each other in a "best-effort" manner using a shared radio resource in unlicensed spectra, sometimes referred to as Internet-of-Things, IoT, devices. This disclosure is directed to the latter type of network and it may be assumed that the traffic load is mostly low such that the shared radio resource is usually unoccupied and that, in spite of the uncoordinated ad-hoc transmissions, there will rarely be any collisions of transmissions occurring simultaneously.

As an example, multiple devices that are located within fairly close geographical proximity may transmit data and messages in an ad-hoc manner directly to neighboring nodes provided that they are within transmission range or "sensing distance", meaning that the transmissions can be received and decoded properly. One of these nodes could be a gateway entity, connecting a group of wireless devices to the Internet or to a cellular network. All devices in such a scenario typically transmit on the same radio resource, e.g. frequency, and are thus able to decode all signals received. In this disclosure, a device that performs transmission of data is denoted "transmit device", and the term "data" is used to denote any information or payload that a transmit device needs to transmit to another node.

In practice, the above scenario may e.g. be a home environment where battery-powered low-cost wireless temperature sensors are integrated with portable heating elements throughout the home. These sensors may respond by sending periodic temperature measurements to a central climate controller which in turn may send instructions to adjust the heating element settings, thereby regulating the home temperature. Additionally, the climate controller may convey the current local environment information to a remote smartphone via the Internet, e.g. to inform the home owner.

In a communication scenario where transmit devices communicate over a shared radio resource in the above manner, it may be assumed that the devices are mostly within each other's transmission range so that all transmissions can reach their destinations. Should the distances between the devices be too large for such direct communication, a relay device may be employed to forward all transmissions it receives, potentially with increased power, so as to improve the communication coverage in the network.

Figure 1:
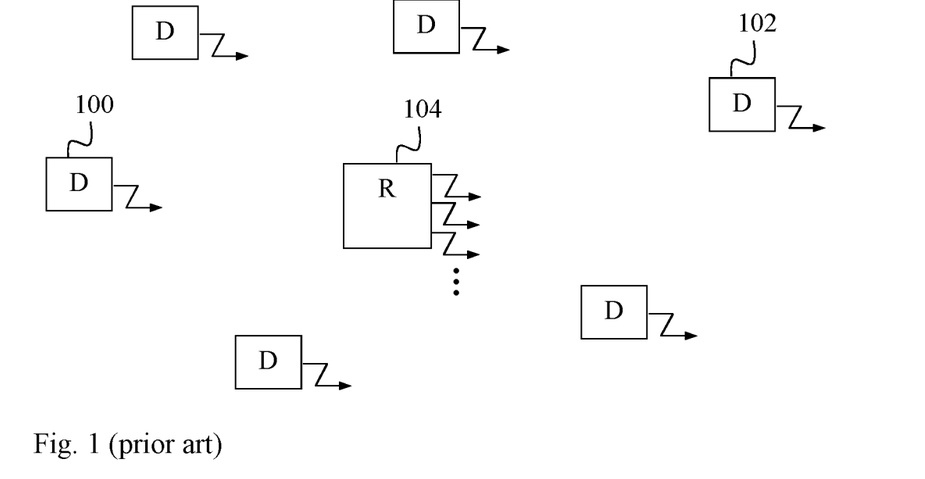
FIG. 1 is a communication scenario illustrating how a relay device may be used in a wireless network, according to the prior art.

FIG. 1 illustrates an example of the above-described scenario where various transmit devices "D" of a wireless network perform transmissions of data where each transmission is addressed to another node, e.g. transmit device, that is typically, but not always, within transmission range to receive the transmission and recognize a destination identity in the transmission as its own identity. In this example however, one transmit device 100 transmits data addressed to another transmit device 102 which is too far away to be able to receive and decode the transmission which thus does not reach the intended destination. It is thus a problem that devices or nodes that are basically located out of transmission range of one another, e.g. at opposite ends of the network, are not able to communicate directly in the manner described above.

In order to overcome the above problem and increase the overall coverage of such a network, it is possible to employ a wireless node basically located "in the middle" that is configured to retransmit any transmissions it receives, thereby acting as a relay to extend the distance of the transmissions. In FIG. 1, a relay device 104 is employed which operates to perform such retransmissions, i.e. forwarding of transmissions it receives. In some implementations the relay device operates on all transmissions even when the original transmission alone would have been sufficient. As a result, a destination node may inefficiently receive two transmissions: first the original transmission from the transmit device and then a redundant identical transmission from the relay device.

To overcome these shortcomings, the relay device 104 can be configured to only forward transmissions of selected traffic from specific nodes, i.e., transmissions that actually require the forwarding functionality such as the above-mentioned transmission from device 100 to device 102. But this functionality can be quite complex to realize as it requires analysis and determination of radio channels between the different nodes and radio capabilities of the individual devices, etc. This is because it must be determined which transmissions need to be retransmitted by the relaying device so that other transmissions will not be retransmitted unnecessarily. As an example, if transmissions from a controller to an Internet gateway do not require relaying, but transmissions from the controller to a sensor do require relaying, then this needs to be determined and programmed into the relay device. Moreover, if transmit devices are moved it is necessary to perform the above analysis repeatedly, e.g. on a regular basis.

To conclude, employing a relay device to enlarge the radio coverage may be either complex to implement efficiently to achieve selective retransmissions only when needed, or it will result in great amounts of redundant retransmissions if they are not selective by forwarding all transmissions.

SUMMARY

It is an object of embodiments described herein to address at least some of the problems and issues outlined above. It is possible to achieve this object and others by using a first transmit device, a relay device and methods therein, as defined in the attached independent claims.

According to one aspect, a method is performed by a first transmit device for supporting wireless communication between transmit devices over a shared radio resource in a wireless network. In this method, the first transmit device records source identities and destination identities of detected transmissions of data made by other transmit devices in the wireless network. The first transmit device further appends a report indicating the source identity and the destination identity of each detected transmission of data, when an own transmission of data is performed.

According to another aspect, a first transmit device is arranged to support wireless communication between transmit devices over a shared radio resource in a wireless network. The first transmit device is configured to record, e.g. by means of a recording unit, source identities and destination identities of detected transmissions of data made by other transmit devices in the wireless network. The first transmit device is also configured to append, e.g. by means of an appending unit, a report indicating the source identity and the destination identity of each detected transmission of data, when an own transmission of data is performed.

According to another aspect, a method is performed by a relay device for supporting wireless communication between transmit devices over a shared radio resource in a wireless network. In this method the relay device receives transmissions of data performed by transmit devices in the wireless network, each transmission having a report appended which indicates previous transmissions of data detected by the respective transmit devices including a source identity and a destination identity for each detected transmission. The relay device further identifies two transmit devices that are not able to communicate directly with each other, based on the reports in the received transmissions, and forwards any transmission(s) of data between the two identified transmit devices.

According to another aspect, a relay device is arranged to support wireless communication between transmit devices over a shared radio resource in a wireless network. The relay device is configured to receive, e.g. by means of a receiving unit, transmissions of data performed by transmit devices in the wireless network, each transmission having a report appended which indicates previous transmissions of data detected by the respective transmit devices including a source identity and a destination identity for each detected transmission. The relay device is further configured to identify, e.g. by means of an identifying unit, two transmit devices that are not able to communicate directly with each other, based on the reports in the received transmissions, and to forward, e.g. by means of a forwarding unit, any transmission(s) of data between the two identified transmit devices.

An example advantage of the above methods and devices is that the relay device can be deployed without having to perform complex configurations and analysis of radio channels and device capabilities. At the same time, the relay device can easily adapt its forwarding operation to changing conditions in the environment that affect the reception of radio signals, by identifying any pairs of devices that need retransmission. Another advantage is that the described procedure is basically dynamic and "self-learning", so that the forwarding operations can be updated on a dynamic basis, e.g. as soon as the topology of the communication network changes.

The above first transmit device, relay device and methods therein may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to facilitate the process of forwarding data transmissions between two transmit devices that are not able to communicate directly with each other, e.g. due to large distance and/or poor radio conditions. This can be achieved by implementing functionality in multiple transmit devices and functionality in a relay device, which enables the relay device to identify the two transmit devices based on reports appended to transmissions of data performed by the transmit devices over a shared radio resource in a wireless network. The reports indicate that transmissions have been detected by the transmit devices earlier and this information can be used by the relay device to find out which devices are within transmission range of each other and which devices are not, the latter thus needing the forwarding. This way, it can be achieved that data transmissions are forwarded only when necessary, i.e. when finding that the two transmit devices cannot communicate directly, based on the above reports, and therefore they need an intermediate relay device.

Figure 2:
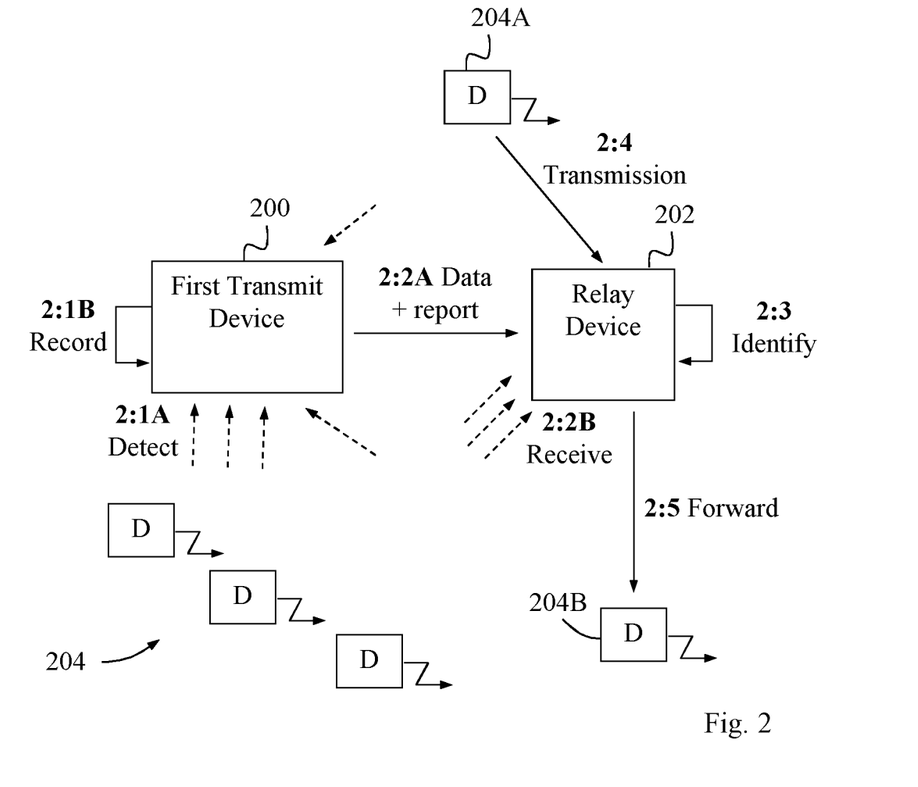
FIG. 2 is a communication scenario illustrating an example of how the solution may be employed, according to some possible embodiments.

FIG. 2 illustrates an example communication scenario where the solution is utilized involving a plurality of transmit devices 204 which perform transmissions of data over a shared radio resource in a wireless network. Each data transmission includes a source identity and a destination identity which can be recorded whenever the data transmission is detected. The transmit devices 204 have functionality which will be described in terms of, and with reference to, a "first transmit device" 200 which is thus representative for the multiple transmit devices 204, i.e. it is assumed that all, or at least some of the transmit devices 204 in the network can operate in the same manner as described herein for the first transmit device 200. A relay device 202 is also shown which is operable to forward any transmissions of data between any two transmit devices that are identified as being unable to communicate directly with each other, as follows.

A first action 2:1A indicates that the transmit devices 204 perform various transmissions of data over the shared radio resource which are detected by the first transmit device 200. As mentioned above, each data transmission contains a destination identity indicating an addressed device that should receive the data and a source identity indicating the device transmitting the data. In parallel with this action, another action 2:1B indicates that the first transmit device 200 records source identities and destination identities of the detected transmissions of data made by the other transmit devices 204. Naturally, there may be some transmissions that the first transmit device 200 cannot detect, e.g. from any device that is located too far away relative to the first transmit device's 200 location. This way the first transmit device 200 may built up a list of source and destination identities of detected data transmissions.

When it is time for the first transmit device 200 to perform an own transmission of data to another device or node, not shown, it appends a report to the transmission indicating the source identity and the destination identity of each previously detected transmission of data in the list. It should be noted that only the source and destination identities of the detected transmissions are appended such that the added overhead in the transmissions is kept low as compared to the data, so that this functionality will not extend the transmission unnecessarily. Another action 2:2A indicates that the first transmit device's 200 transmission of data and the appended report is received by the relay device 202. Another action 2:2B indicates that the relay device 202 receives transmissions of data with such appended reports from various other transmit devices 204 as well over time.

At some point when an ample amount of data transmissions with appended reports have been received as of actions 2:2A, 2:2B, the relay device 202 is able to identify two transmit devices 204A, 204B that are not able to communicate directly with each other, as shown by a further action 2:3. This can be found out e.g. if a data transmission from device 204A with device 204B as destination is reported by one or more other devices 204 but not by the addressed device 204B, which thus implies that device 204B is not able to hear transmissions from device 204A. This way, the relay device 202 will learn over time, which pairs of transmit devices that cannot communicate directly with each other and therefore need the forwarding of data transmissions.

A further action 2:4 indicates that the relay device 202 receives another data transmission from device 204A with device 204B as destination. The relay device 202 then forwards the data transmission to the transmit device 204B, as shown by another action 2:5. Having identified the two transmit devices 204A, 204B as not being able to communicate directly with each other, the relay device 202 will forward any transmissions of data between the two identified transmit devices 204A and 204B so that actions 2:4 and 2:5 can be repeated whenever necessary. It is thus also possible that the relay device 202 can forward transmissions of data in the opposite direction, i.e. data transmissions from device 204B with device 204A as destination.

Figure 3:
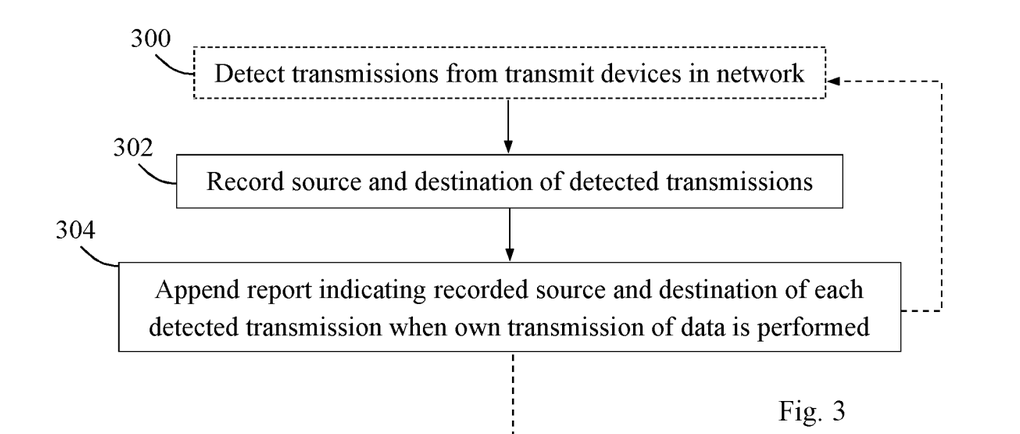
FIG. 3 is a flow chart illustrating a procedure in a first transmit device, according to further possible embodiments.

An example of how the solution may be employed will now be described with reference to the flow chart in FIG. 3 and in terms of actions performed by a first transmit device such as the above-described transmit device 200. FIG. 3 thus illustrates a procedure in the first transmit device for supporting wireless communication between transmit devices over a shared radio resource in a wireless network. Some optional example embodiments that could be used in this procedure will also be described. Reference will also be made, without limiting the described features and embodiments, to the example scenario shown in FIG. 2.

A first action 300 illustrates that the first transmit device 200 may detect various transmissions of data made by other transmit devices 204 in the wireless network, which corresponds to action 2:1A. Such detection of data transmissions may be done on a more or less continuous basis, that is whenever any other transmit device 204 performs a data transmission that the first transmit device 200 is able to receive and decode. It can consequently be assumed that the first transmit device 200 is not able to detect a transmission made by any transmit device that is beyond transmission range, i.e. "sensing distance", of the first transmit device 200.

Another action 302 illustrates that the first transmit device 200 records source identities and destination identities of detected transmissions of data made by other transmit devices 204 in the wireless network, which corresponds to action 2:1B. In other words, whenever a transmission of data is detected, the first transmit device 200 records the source identity and the destination identity of the detected transmission, such that a list of source and destination identities of detected data transmissions is built up.

In a final shown action 304, the first transmit device 200 appends a report indicating the source identity and the destination identity of each detected transmission of data, when an own transmission of data is performed, which corresponds to action 2:2A. Some examples of how a transmit device may append such information to an own data transmission, will be outlined in more detail later below with reference to FIGS. 5 and 6. It should be noted that the first transmit device 200 waits with appending such a report until there is data to transmit. The transmission of data as such is not dependent of the detection and recording of previous transmissions and can be done in a conventional manner. The only difference is that the report can be appended once the data transmission is made.

Once a report has been appended to an own data transmission, the first transmit device 200 may start all over again to build up a new report with source identities and destination identities of further detected transmissions of data, such that actions 300-304 may basically be repeated after each own data transmission with a report appended, as indicated by a dashed arrow.

Some non-limiting example embodiments that can be used in the above procedure, will now be described. Basically, the appended report may indicate any previous data transmissions detected since a preceding report was appended to an own data transmission. However, it may be helpful to limit the number of detected data transmissions in the report, e.g. if a long time has gone and/or if a large number of other transmissions have been detected and recorded since the last data transmission with report was made by the first transmit device. This may be done as follows.

In one example embodiment, the appended report may indicate a predetermined number N of the most recently detected transmissions. In another example embodiment, the appended report may indicate transmissions detected during a predetermined time period prior to the own transmission. The above two embodiments may be used separately or in combination so that in case the number of transmissions detected during the predetermined time period exceeds N, only the N most recently detected transmissions are indicated in the report.

In another example embodiment, multiple detected transmissions with the same source and destination may be indicated separately in the report with a sequence number for each transmission. An example of how this can be done will be described later below with reference to FIGS. 5 and 6. In another example embodiment, the sequence numbers may be associated with a data stream between said source and destination. Such a data stream may thus involve transmission of data in a series of packets which can be identified by a sequence number in each successive packet.

Figure 4:
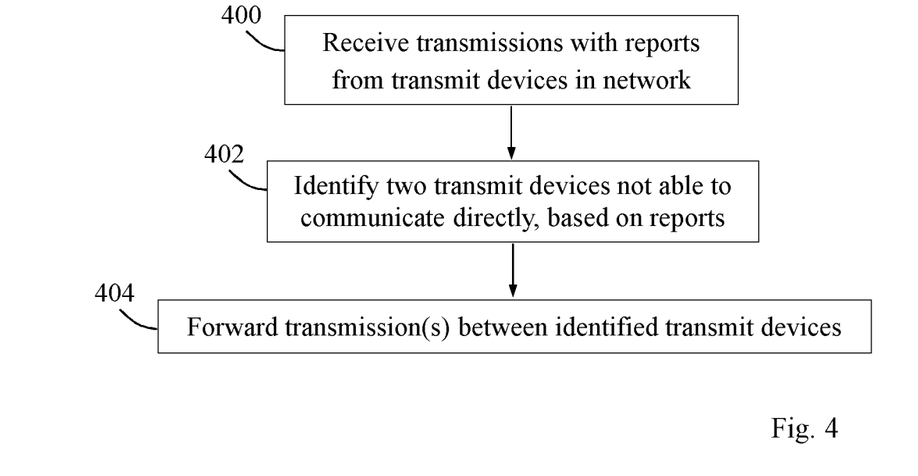
FIG. 4 is a flow chart illustrating a procedure in a relay device, according to further possible embodiments.

Another example of how the solution may be employed will now be described with reference to the flow chart in FIG. 4 and in terms of actions performed by a relay device such as the above-described relay device 202. FIG. 4 thus illustrates a procedure in the relay device, for supporting wireless communication between transmit devices over a shared radio resource in a wireless network. Some optional example embodiments that could be used in this procedure will also be described. Reference will again also be made, without limiting the described features and embodiments, to the example scenario shown in FIG. 2.

A first action 400 illustrates that the relay device 202 receives transmissions of data performed by transmit devices 204 in the wireless network, each transmission having a report appended which indicates previous transmissions of data detected by the respective transmit devices including a source identity and a destination identity for each detected transmission. This action corresponds to action 2:2B and the received transmissions may be sent from each transmit device in accordance with action 304.

In a further action 402, the relay device 202 identifies two transmit devices 204A, 204B that are not able to communicate directly with each other, based on the reports in the received transmissions, which corresponds to action 2:3. For example, the reports may indicate that a data transmission made by transmit device 204A have been detected by one or more other devices while a report from transmit device 204B does not indicate that the data transmission from device 204A was detected by transmit device 204B. It can then be concluded that this data transmission was not heard by transmit device 204B, and that the two transmit devices 204A, 204B are likely beyond transmission range from each other.

Having identified the two transmit devices 204A, 204B, a further action 404 indicates that the relay device 202 forwards any transmission(s) of data between the two identified transmit devices, which corresponds to action 2:5. For example, the two transmit devices 204A, 204B may be identified on the basis of two or more received transmissions with appended reports as described above, e.g. to confirm that they really are beyond transmission range. In another example, the relay device 202 may decide to start forwarding data transmissions as of action 404, on condition that the reports indicate that the number of data transmissions from device 204A that could not be heard by transmit device 204B, or vice versa, exceeds a certain percentage.

Some non-limiting example embodiments that can be used in the above procedure, will now be described. In one example embodiment, the two transmit devices 204A, 204B may be identified when a transmission of data between the two transmit devices indicated in a report from any other transmit device 204 is not indicated in any report from at least one of the two identified transmit devices 204A, 204B.

In another example embodiment, multiple transmissions of data may be forwarded between the two identified transmit devices until a report from one of the two identified transmit devices indicates that a transmission of data from the other one of the two identified transmit devices has been detected twice. It can thus be concluded from this report that the two identified transmit devices 204A, 204B are now able to communicate directly with each other since this report from one of the devices indicates that the same data transmission has been properly received twice, firstly from the original transmission and secondly from the forwarded transmission. Thereby, it is no longer necessary to forward the transmissions between the devices. For example, the devices 204A, 204B may have been moved to be within transmission range and/or the radio conditions may have been improved.

Figure 5:
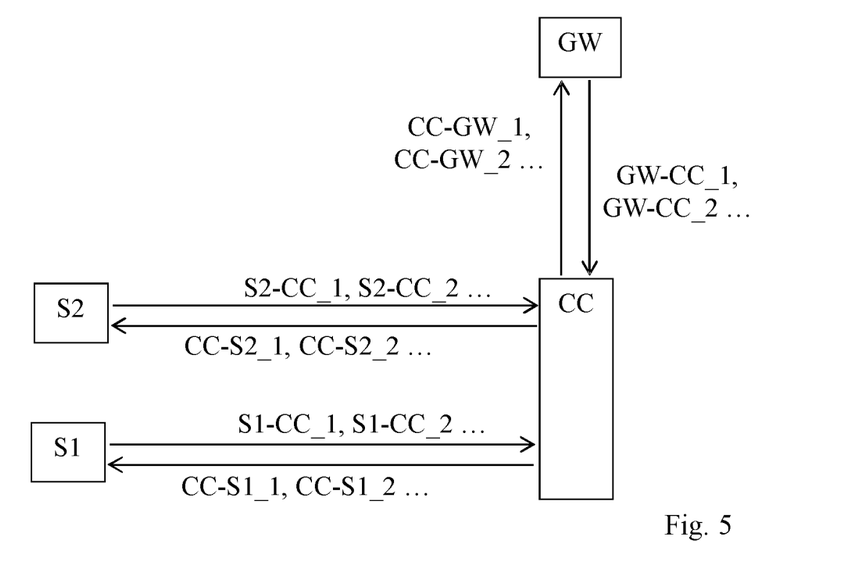
FIG. 5 is a signaling diagram illustrating an example of transmissions of data between nodes where the solution may be used.

Some examples of how a transmit device such as device 200 may append a report with detected transmissions to an own data transmission, will now be described with reference to FIGS. 5 and 6. FIG. 5 illustrates a communication scenario involving four nodes, i.e. transmit devices, including two sensors denoted S1 and S2, a control center denoted CC, and a gateway denoted GW. These four nodes are simply referred to as devices for short. In this communication, the following conditions A-E may apply:

A) The sensors S1 and S2 report to the control center CC, e.g. a climate controller device. The CC in turn can communicate with a user's smartphone on the Internet via the gateway, GW.

B) The four devices all communicate wirelessly on a shared radio resource, e.g. the same radio frequency, and are capable of understanding each other's transmissions.

C) The devices all continuously transmit information "periodically" over time, in an uncoordinated fashion, independently of each other.

D) Each transmission can be uniquely identified by its content, e.g., via MAC-level header fields in each transmission, or sequence numbers, etc.

E) When idle, each device constantly listens to the shared radio resource for incoming transmissions.

F) A relay device, not shown, is able to receive all transmissions described and can thus read all the appended reports.

Various data streams are communicated between the nodes as follows. Device S1 sends a data stream to device CC with packets denoted S1-CC_1, S1-CC_2 . . . . Further, device CC sends a data stream back to device S1 with packets denoted CC-S1_1, CC-S1_2 . . . . In the same manner, device S2 sends a data stream to device CC with packets denoted S2-CC_1, S2-CC_2 . . . and device CC sends a data stream back to device S2 with packets denoted CC-S2_1, CC-S2_2 . . . . Also, device CC sends a data stream to device GW with packets denoted CC-GW_1, CC-GW_2 . . . and, device GW sends a data stream back to device CC with packets denoted CC-GW_1, CC-GW_2 . . . . The last number in the transmissions is the sequence number of the respective stream.

Figure 6:
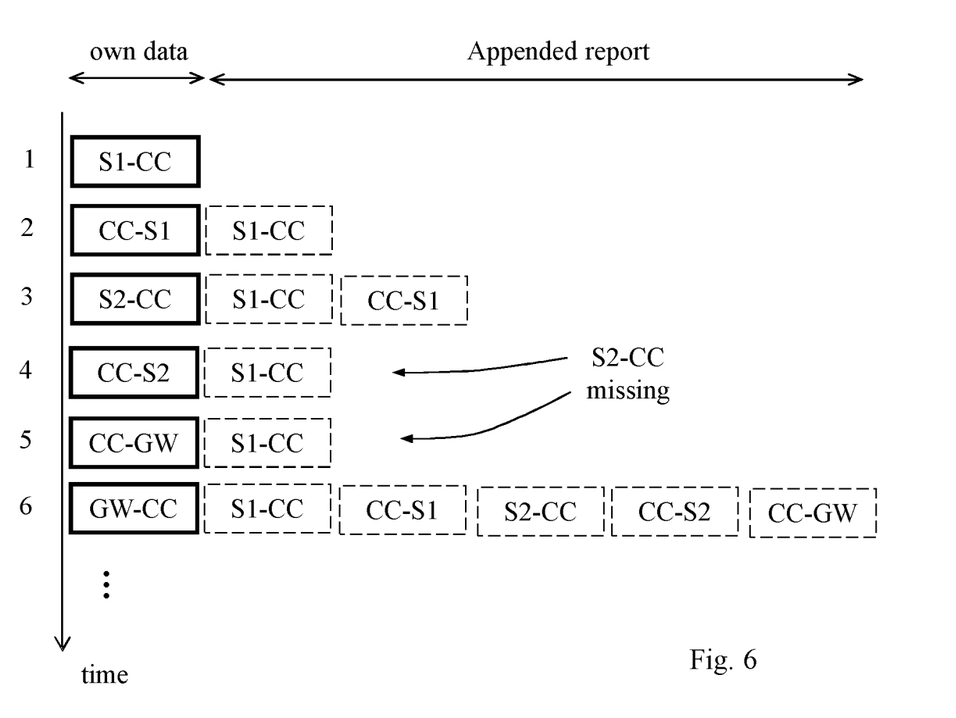
FIG. 6 is a diagram illustrating how a report may be appended to transmissions of data, according to further possible embodiments.

FIG. 6 illustrates a number of transmissions 1-6 that occur over time in the scenario of FIG. 5. Transmissions of own data are shown as fat-lined boxes while appended reports are shown as a dashed boxes in FIG. 6. In this example, all devices can hear each other except devices S2 and CC which are too far apart, i.e. beyond transmission range.

Transmission 1:

Device S1 transmits its own data to device CC. This transmission 1 is detected by all other devices S2, CC and GW.

Transmission 2:

Device CC transmits its own data to device S1, with a report appended that indicates the detected transmission 1. This transmission 2 is detected by all other devices S1, S2 and GW.

Transmission 3:

Device S2 transmits its own data to device CC, with a report appended that indicates the detected transmissions 1 and 2. This transmission 3 is in turn detected by devices S1 and GW but not by device CC.

Transmission 4:

Device CC transmits its own data to device S2, with a report appended that indicates the detected transmission 1, but not transmission 3. This transmission 4 is detected by all other devices S1, S2 and GW.

Transmission 5:

Device CC transmits its own data to device GW, with a report appended that indicates the detected transmission 1, but not transmission 3. This transmission 5 is detected by all other devices S1, S2 and GW.

Transmission 6:

Device GW transmits its own data to device CC, with a report appended that indicates the detected transmissions 1-5.

Although transmissions 1-6 may refer to the first packets in respective data streams, the above communication of data between the devices may continue with further sequence numbers, which is not necessary to describe herein any further. It can be seen that transmission 3 (S2-CC) is absent from the reports in transmissions 4 and 5, but it appears in transmission 6. This indicates that device CC never heard this original transmission and suggests that CC is unable to receive transmissions from S2. Thereby, the relay device can identify the two devices S2 and CC as not being able to communicate directly with each other, based on the reports in the received transmissions, and decide to forward data transmissions at least from device S2 to device CC.

Figure 7:
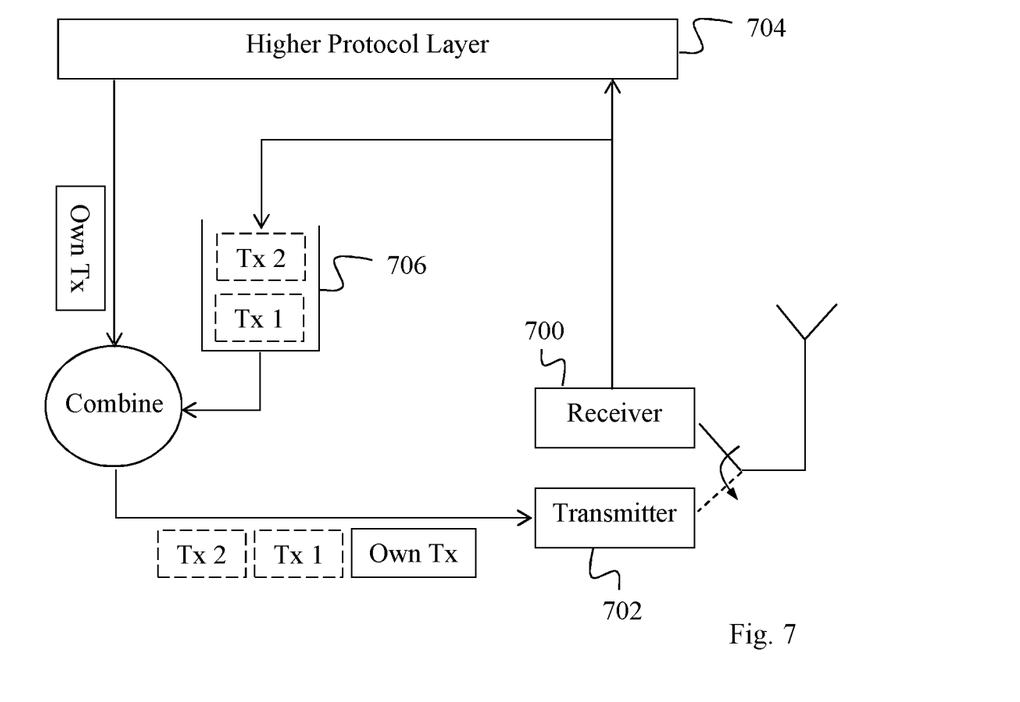
FIG. 7 is a block diagram illustrating how a first transmit device may operate, according to further possible embodiments.

An example will now be briefly outlined of how the above first transmit device may operate in practice, with reference to the block diagram in FIG. 7. The first transmit device in this example has a receiver circuitry 700 and a transmitter circuitry 702 which can both be connected to an antenna. The procedure disclosed in FIG. 3 is controlled by a control function denoted "Higher Protocol Layer" 704 which also controls any own data transmissions. Whenever a data transmission Tx is received by the receiver circuitry 700, and thus detected as of action 300, the source and destination addresses of the data transmission Tx are recorded by placing them in a list schematically shown as a storage 706 which could also be called a "recorded queue". Two entries Tx1 and Tx2 recorded so far are shown in the figure.

At some point, the Higher Protocol Layer 704 produces data to be transmitted, denoted "own Tx", and the recorded entries Tx1 and Tx2 are added as a report to the own Tx by means of a combine function. Then, the own Tx is transmitted with the report of Tx1 and Tx2 appended, by the transmitter circuitry 702.

Figure 8:
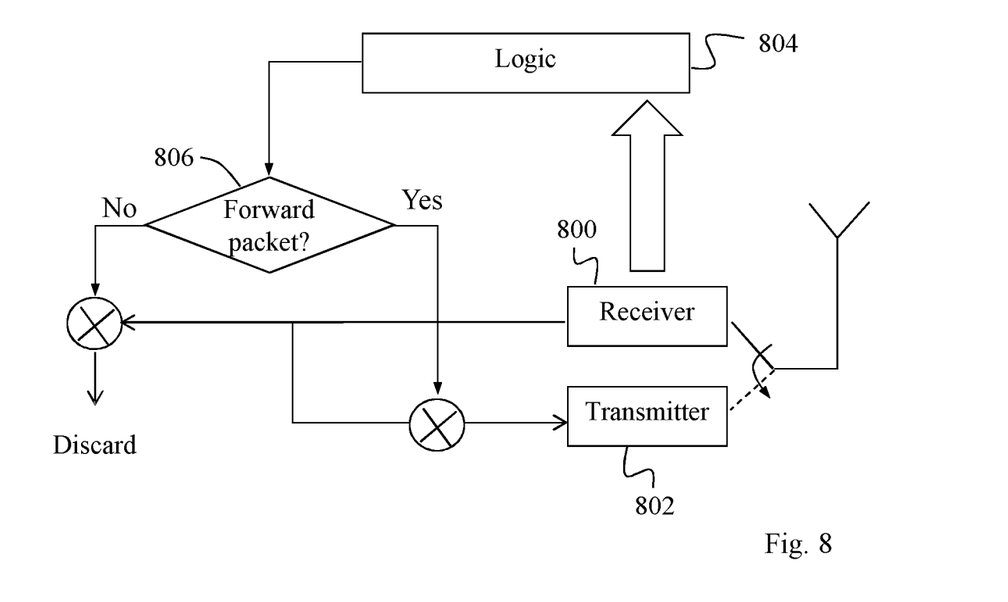
FIG. 8 is a block diagram illustrating how a relay device may operate, according to further possible embodiments.

An example will now also be briefly outlined of how the above relay device may operate in practice, with reference to the block diagram in FIG. 8. The relay device in this example has likewise a receiver circuitry 800 and a transmitter circuitry 802 which can both be connected to an antenna. The procedure disclosed in FIG. 4 is controlled by a logic 804 which is configured to identify any two transmit devices that are not able to hear each other. The receiver circuitry 800 receives various data transmissions with the above-described reports appended. By analyzing the reports in the logic 804, two transmit devices that are unable to communicate directly with each other can be identified, e.g. in the manner described above for FIGS. 5 and 6.

Whenever a transmitted packet with data is received by the receiver circuitry 800, the packet is analyzed by the logic 804 to determine its source and destination, and it is then decided at 806 whether it is necessary to forward this packet, i.e. when the source and destination of the packet correspond to the identified two devices. If not, the packet can simply be discarded without retransmission. Otherwise the packet is transferred to the transmitter circuitry 802 and forwarded by retransmission. It should be noted that the packet is forwarded as is, thus without being altered in any way, so that the receiving device will not even notice that it has been forwarded by the relay device.

Figure 9:
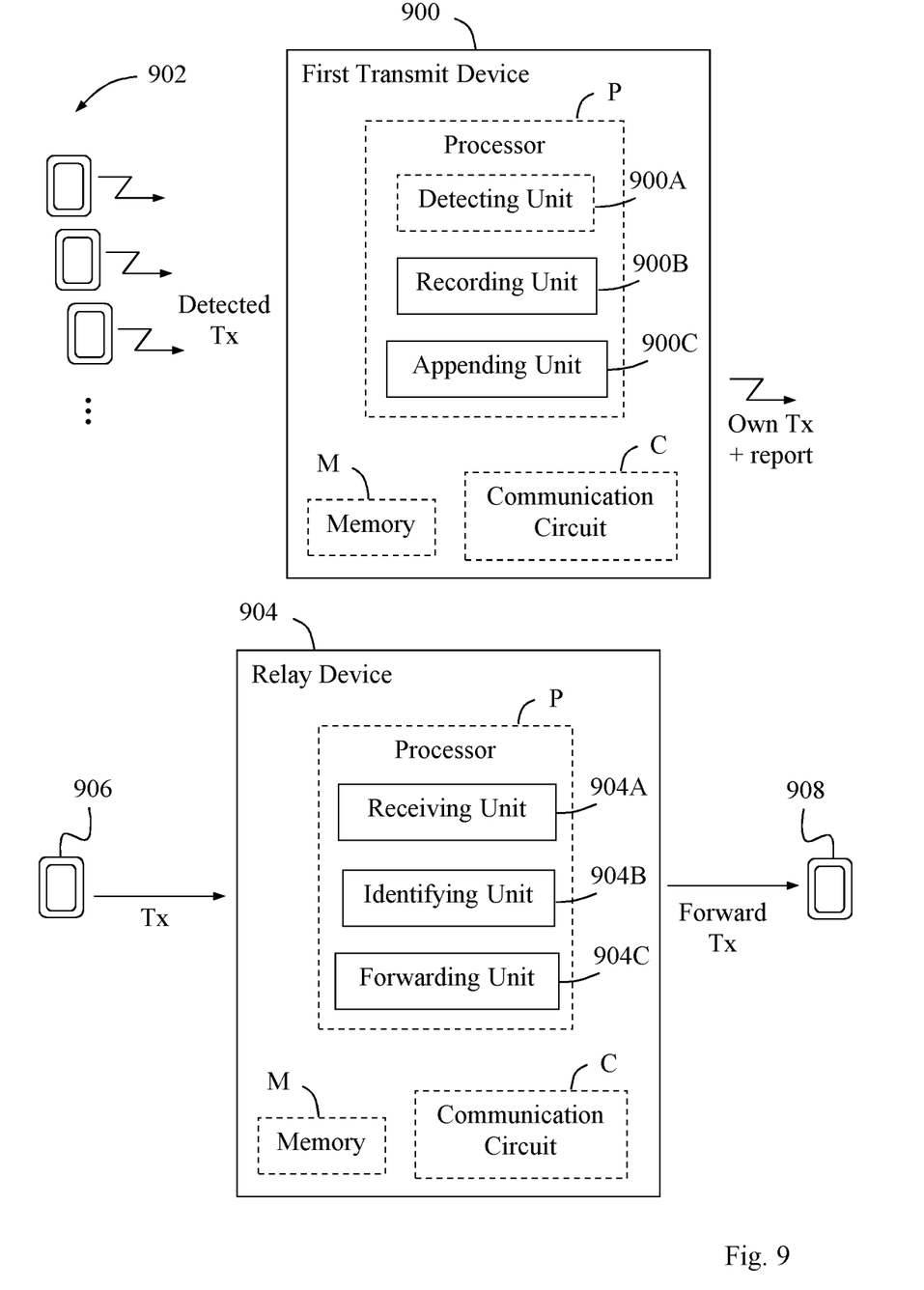
FIG. 9 is a block diagram illustrating how a first transmit device and a relay device may be configured, according to further possible embodiments.

The block diagram in FIG. 9 illustrates a detailed but non-limiting example of how a first transmit device 900 and a relay device 904, respectively, may be structured to bring about the above-described solution and embodiments thereof. In this figure, the first transmit device 900 and the relay device 904 may be configured to operate according to any of the examples and embodiments of employing the solution as described above, where appropriate, and as follows. Each of the first transmit device 900 and the relay device 904 is shown to comprise a processor "P" and a memory "M" containing instructions executable by the processor P, whereby the first transmit device 900 and the relay device 904 are configured to operate as follows. Each of the first transmit device 900 and the relay device 904 may further comprise a communication circuit "C" with suitable equipment for transmitting and receiving messages in the manner described herein.

The communication circuit C in each of the first transmit device 900 and the relay device 904 thus comprises equipment configured for communication over a radio interface using a suitable protocol for the communication depending on the implementation. The solution is however not limited to any specific types of protocols.

The first transmit device 900 comprises means, e.g. in the form of units or the like, configured or arranged to perform at least some of the actions of the flow chart in FIG. 3 in the manner described herein. Further, the relay device 904 comprises means, e.g. in the form of units or the like, configured or arranged to perform the actions of the flow chart in FIG. 4 in the manner described above. These actions and procedures may be performed by means of functional units in the respective processor P in the first transmit device 900 and the relay device 904 as follows.

The first transmit device 900 is arranged to support wireless communication between transmit devices over a shared radio resource in a wireless network. The first transmit device 900 may be configured to detect transmissions of data made by other transmit devices 902 in the wireless network. This operation may be performed by a detecting unit 900A in the first transmit device 900, e.g. in the manner described for action 300.

The first transmit device 900 is configured to record source identities and destination identities of detected transmissions of data made by other transmit devices 902 in the wireless network. This operation may be performed by a recording unit 900B in the first transmit device 900, e.g. in the manner described for action 302.

The first transmit device 900 is also configured to append a report indicating the source identity and the destination identity of each detected transmission of data, when an own transmission of data is performed. This operation may be performed by an appending unit 900C in the first transmit device 900, e.g. in the manner described for action 304. Thereby, the relay device 904 is enabled to receive the report and similar reports from other transmit devices, and to use the reports to identify any pair of transmit devices 906, 908 that are not able to communicate directly with each other, and to forward any transmissions of data between the two transmit devices 906, 908.

The relay device 904 is arranged to support wireless communication between transmit devices over a shared radio resource in a wireless network. The relay device 904 is configured to receive transmissions of data performed by transmit devices in the wireless network, each transmission having a report appended which indicates previous transmissions of data detected by the respective transmit devices including a source identity and a destination identity for each detected transmission. This operation may be performed by a receiving unit 904A in the relay device 904, e.g. as described above for action 400.

The relay device 904 is further configured to identify two transmit devices 906, 908 that are not able to communicate directly with each other, based on the reports in the received transmissions. This operation may be performed by an identifying unit 904B in the relay device 904, e.g. as described above for action 402. The relay device 904 is also configured to forward any transmission(s) of data between the two identified transmit devices 906, 908. This operation may be performed by a forwarding unit 904C in the relay device 904, e.g. as described above for action 404.

It should be noted that FIG. 9 illustrates various functional modules in the first transmit device 900 and the relay device 904, respectively, and the skilled person is able to implement these functional modules in practice using suitable software and hardware. Thus, the solution is generally not limited to the shown structures of the first transmit device 900 and the relay device 904, and the functional units therein may be configured to operate according to any of the features and embodiments described in this disclosure, where appropriate.

The functional modules 900A-C and 904A-C described above can be implemented in the first transmit device 900 and the relay device 904, respectively, by means of program modules of a respective computer program comprising code means which, when run by the processor P causes the first transmit device 900 and the relay device 904 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the first transmit device 900 and the relay device 904 in the form of a memory having a computer readable medium and being connected to the processor P. The computer program product or memory M in each of the first transmit device 900 and the relay device 904 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective transmit device 900 and relay device 904.

The solution described herein may be implemented in each of the first transmit device 900 and the relay device 904 by a computer program comprising instructions which, when executed on at least one processor, cause the at least one processor to carry out the actions according to any of the above embodiments, where appropriate. The solution may also be implemented at each of the first transmit device 900 and the relay device 904 in a carrier containing the above computer program, wherein the carrier is one of an electronic signal, optical signal, radio signal, or computer readable storage medium.

Advantages that may be achieved by implementing the above-described solution and embodiments include, without limitation, the following advantages 1-5.

1) Using a relay device itself brings numerous benefits, including coverage extension and improvements of received signal quality, as well as potential power savings from lower-energy transmission.
2) The solution enables the deployment of a relay device while avoiding the cost of complex configurations and analysis of radio channels and device capabilities. At the same time, the relay device can easily adapt its forwarding operation to changing conditions in the environment that affect the reception of radio signals, by identifying any pairs of devices that need retransmission based on further received reports.
3) The procedures described herein have the added benefit of being completely dynamic and "self-learning", so that the forwarding operations can be updated on the fly autonomously, should the topology of the communication network change.
4) A further advantage of the solution is that only minimal changes need to be introduced to the communication protocol, making it practical for low-complexity devices to implement, e.g., in IoT scenarios. The communication performance with this modified communication protocol should be unaffected if no relay device is employed, and significantly better if the relay device is employed.
5) The solution may be especially suitable for IoT scenarios comprising of short-range radio technologies operating in an ad-hoc wireless mesh network, e.g., comprised of inexpensive low-powered sensors and controllers in a home environment.

While the solution has been described with reference to specific exemplifying embodiments, the description is generally only intended to illustrate the inventive concept and should not be taken as limiting the scope of the solution. For example, the terms "transmit device", "relay device", "data" and "transmission" have been used throughout this disclosure, although any other corresponding entities, functions, and/or parameters could also be used having the features and characteristics described here. The solution is defined by the appended claims.

The invention claimed is:

1. A method performed by a first transmit device for supporting wireless communication between transmit devices over a shared radio resource in a wireless network, the method comprising:
   recording source identities and destination identities of detected transmissions of data made by other transmit devices in the wireless network; and
   performing one or more transmissions of data, each transmission having appended thereto a report indicating one or more recorded source identities and one or more recorded destination identities of the detected transmissions of data,
   wherein multiple detected transmissions with the same source and destination are indicated separately in the report with a sequence number for each transmission.

2. A method according to claim 1, wherein the report appended to a particular transmission relates to a predetermined number, N, of the most recently detected transmissions.

3. A method according to claim 1, wherein the report appended to a particular transmission relates to transmissions detected during a predetermined time period prior to the particular transmission.

4. A method according to claim 1, wherein the sequence numbers are associated with a data stream between said source and destination.

5. A non-transitory, computer-readable medium storing computer-executable instructions that, when executed on at least one processor comprising a first transmit device in a wireless network, configure the first transmit device to perform operations corresponding to the method of claim 1.

6. A first transmit device arranged to support wireless communication between transmit devices over a shared radio resource in a wireless network, the first transmit device comprising:
 a processor; and
 a memory containing instructions executable by the processor, wherein execution of the instructions configures the first transmit device to:
  record source identities and destination identities of detected transmissions of data made by other transmit devices in the wireless network, and
  perform one or more transmissions of data, each transmission having appended thereto a report indicating one or more recorded source identities and one or more recorded destination identities of the detected transmissions of data,
   wherein the report appended to a particular transmission indicates multiple detected transmissions having the same source identity and having the same destination identity, wherein the report further indicates a different sequence number for each of the multiple detected transmissions.

7. A first transmit device according to claim 6, wherein the report appended to a particular transmission relates to a predetermined number, N, of the most recently detected transmissions.

8. A first transmit device according to claim 6, wherein the report appended to a particular transmission relates to transmissions detected during a predetermined time period prior to the particular transmission.

9. A first transmit device according to claim 6, wherein the sequence numbers are associated with a data stream between said source and destination.

10. A method performed by a relay device for supporting wireless communication between transmit devices over a shared radio resource in a wireless network, the method comprising:
 receiving transmissions of data from transmit devices in the wireless network, each transmission having a report appended which indicates previous transmissions of data detected by the respective transmit devices including a source identity and a destination identity for each detected transmission,
 identifying two transmit devices that are not able to communicate directly with each other, based on the reports in the received transmissions,
  wherein the two transmit devices are identified when a transmission of data between the two transmit devices indicated in a report from any other transmit device is not indicated in any report from at least one of the two identified transmit devices, and
 forwarding one or more transmissions of data between the two identified transmit devices.

11. A method according to claim 10, wherein the transmissions of data are forwarded between the two identified transmit devices until a report received from one of the identified transmit devices indicates that a transmission of data from the other of the identified transmit devices has been detected twice.

12. A non-transitory, computer-readable medium storing computer-executable instructions that, when executed on at least one processor comprising a relay device in a wireless network, configure the relay device to perform operations corresponding to the method of claim 10.

13. A relay device arranged to support wireless communication between transmit devices over a shared radio resource in a wireless network, the relay device comprising:
 a processor; and
 memory containing instructions executable by the processor, wherein execution of the instructions configures the relay device to:
  receive transmissions of data from transmit devices in the wireless network, each transmission having a report appended which indicates previous transmissions of data detected by the respective transmit devices including a source identity and a destination identity for each detected transmission,
  identify two transmit devices that are not able to communicate directly with each other, based on the reports in the received transmissions, and
  forward one or more transmissions of data between the two identified transmit devices,
   wherein forward transmissions of data between the two identified transmit devices until a report received from one of the identified transmit devices indicates that a transmission of data from the other of the identified transmit devices has been detected twice.

14. A relay device according to claim 13, wherein execution of the instructions configures the relay device to identify the two transmit devices based on the reports when a particular transmission of data between the two transmit devices indicated in a report from any other transmit device in the wireless network, but is not indicated in any report received from either of the two identified transmit devices.

* * * * *